US012645442B2

(12) United States Patent
Yang et al.

(10) Patent No.: US 12,645,442 B2
(45) Date of Patent: Jun. 2, 2026

(54) VEHICLE SOFTWARE UPDATE SYSTEM AND METHOD THEREOF

(71) Applicants:Hyundai Motor Company, Seoul (KR); Kia Corporation, Seoul (KR)

(72) Inventors: Young Jee Yang, Seongnam-Si (KR); Myeong Gyu Jeong, Seoul (KR); Jin Ah Kim, Gyeonggi-Do (KR); Hak Jun Kim, Goyang-Si (KR); Min Gi Kim, Wonju-Si (KR); Hyeok Sang Jeong, Gunpo-si (KR); Yoon Sik Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 458 days.

(21) Appl. No.: 18/199,446

(22) Filed: May 19, 2023

(65) Prior Publication Data

US 2024/0078104 A1 Mar. 7, 2024

(30) Foreign Application Priority Data

Sep. 6, 2022 (KR) ........................ 10-2022-0113014

(51) Int. Cl.
| | |
|---|---|
| *G06F 9/44* | (2018.01) |
| *B60R 16/03* | (2006.01) |
| *B60R 25/10* | (2013.01) |
| *B60R 25/30* | (2013.01) |
| *G06F 8/65* | (2018.01) |

(52) U.S. Cl.
CPC ................ *G06F 8/65* (2013.01); *B60R 16/03* (2013.01); *B60R 25/10* (2013.01); *B60R 25/307* (2013.01)

(58) Field of Classification Search
CPC ........................................................ G06F 8/65
USPC ........................................................ 717/171
See application file for complete search history.

(56) References Cited

U.S. PATENT DOCUMENTS

2018/0321929 A1* 11/2018 Persson ................ H04L 63/123
2021/0201599 A1* 7/2021 Shionoya ............. G07C 5/0841

* cited by examiner

*Primary Examiner* — Evral E Bodden
(74) *Attorney, Agent, or Firm* — Banner & Witcoff, Ltd.

(57) ABSTRACT

A vehicular software update system for remotely performing a software update of a vehicle and a method thereof are provided. The vehicular software update system includes a management controller installed in a vehicle and a server that performs a remote software update in cooperation with the management controller. The management controller controls the vehicle to start in response to receiving a request for the remote software update from the server, downloads software for update from the server after controlling the vehicle to start, transmits the downloaded software for update to a performance controller in the background, determines whether the transmission of the software for update in the background is completed based on the vehicle being turned off, and performs a software update of the performance controller using the software for update based on the transmission of the software for update in the background being completed.

19 Claims, 3 Drawing Sheets

VEHICLE SOFTWARE UPDATE SYSTEM AND METHOD THEREOF

CROSS-REFERENCE TO RELATED APPLICATION

This application claims the benefit of priority to Korean Patent Application No. 10-2022-0113014, filed in the Korean Intellectual Property Office on Sep. 6, 2022, the entire contents of which are incorporated herein by reference.

TECHNICAL FIELD

The present disclosure relates to a vehicular software update system.

BACKGROUND

An over-the-air (OTA) software update technology for vehicle may provide a function for assisting a vehicle in downloading update data (e.g., firmware) in an OTA manner while the vehicle is traveling and updating vehicle software. If there is new software (or latest version software) as a software version registered with an OTA server is compared with a software version embedded in the vehicle, an OTA software update for vehicle may be executed when an OTA performance condition is met after the downloading of the new software is completed. In such an OTA software update service for vehicle, a user makes the vehicle available for a software update as he or she drives the vehicle, and an OTA software update is performed based on a user approval when the starting of the vehicle is ended.

SUMMARY

The following summary presents a simplified summary of certain features. The summary is not an extensive overview and is not intended to identify key or critical elements.

An aspect of the present disclosure provides a vehicular software update system for remotely identifying a vehicle state using a connected car system (CCS) service and performing an over-the-air (OTA) software update and a method thereof.

The technical problems to be solved by the present disclosure are not limited to the aforementioned problems, and any other technical problems not mentioned herein will be clearly understood from the following description by those skilled in the art to which the present disclosure pertains.

A vehicular software update system may comprise: a management controller installed in a vehicle, wherein the management controller is configured to: control the vehicle to start in response to receiving a request for a remote software update from a server; download software for update from the server after controlling the vehicle to start; transmit the downloaded software for update to a performance controller in a background; determine, based on the vehicle being turned off, whether the transmission of the downloaded software for update in the background is completed; and perform, based on the transmission of the downloaded software for update in the background being completed, a software update of the performance controller using the downloaded software for update.

The management controller may be configured to receive a control command for the remote software update using a connected car system. The control command may comprise the request for the remote software update.

The management controller may be configured to: determine, based on a vehicle power state, whether to initiate the remote software update; and determine, based on the request for the remote software update being received, whether a software update proceeds through over the air (OTA).

The management controller may be configured to: determine whether it is possible to start the vehicle by a power controller; and transmit, based on determining that it is possible to start the vehicle, a request to turn on the vehicle to the power controller. The power controller may be configured to: determine whether it is possible to start the vehicle based on at least one of: a vehicle power state, a gear state, an absence of an OTA start prohibition request, or an absence of a burglar alarm; and turn on the vehicle based on the request to turn on the vehicle.

The power controller may be configured to maintain a start state of the vehicle based on: a vehicle start duration included in a control command transmitted from the server; and an update progress state.

The management controller may be configured to determine, based on the vehicle being turned off, whether the transmission of the downloaded software for update in the background is completed within a vehicle start duration.

The management controller may be configured to start the software update of the performance controller based on: the transmission of the downloaded software for update in the background being completed within a vehicle start duration; or the vehicle start duration being expired and the transmission of the downloaded software for update in the background being completed.

The management controller may be configured to cancel the software update of the performance controller based on: the transmission of the downloaded software for update in the background being incomplete; and a vehicle start duration being expired.

The management controller may be configured to cancel the software update of the performance controller based on at least one of: an absence of a separate start-off request in a state where a maximum start duration of a power controller elapses; a start-off signal according to manipulation of a start button being received; a manipulation of a brake pedal being detected; a gear shift being detected; a remote start control command being received from a user terminal; or an activation of a burglar alarm.

The management controller may be configured to identify a vehicle state based on: a setting of the server; and the transmission of the downloaded software for update in the background being completed.

A vehicular software update method may comprise: receiving, by a management controller of a vehicle, a request for a remote software update from a server; controlling, by the management controller and based on the request for the remote software update, the vehicle to start; downloading, by the management controller, software for update from the server after controlling the vehicle to start; transmitting, by the management controller, the downloaded software for update to a performance controller in a background; determining, by the management controller and based on the vehicle being turned off, whether the transmission of the downloaded software for update in the background is completed; and performing, by the management controller and based on the transmission of the downloaded software for update in the background being completed, a software update of the performance controller using the downloaded software for update.

The method may further comprise determining, by the management controller and based on a vehicle power state, whether to initiate the remote software update; and determining, by the management controller and based on the request for the remote software update being received, whether a software update proceeds through over the air (OTA).

The receiving of the request for the remote software update may comprise receiving the request for the remote software update using a connected car system.

The controlling of the vehicle to start may comprise: determining, by a power controller of the vehicle, whether it is possible to start the vehicle based on at least one of: a vehicle power state, a gear state, an absence of an OTA start prohibition request, or an absence of a burglar alarm; transmitting, by the management controller and based on determining that it is possible to start the vehicle, a request to turn on the vehicle to the power controller; and turning on, by the power controller and based on the request to turn on the vehicle, the vehicle.

The determining of whether the transmission of the downloaded software for update in the background is completed may comprise: maintaining, by the power controller, a start state of the vehicle based on: a vehicle start duration included in a control command transmitted from the server; and an update progress state.

The determining of whether the transmission of the downloaded software for update in the background is completed may comprise: determining, by the management controller and based on the vehicle being turned off, whether the transmission of the downloaded software for update in the background is completed within a vehicle start duration.

The performing of the software update of the performance controller may comprise: starting, by the management controller, the software update of the performance controller based on: the transmission of the downloaded software for update in the background being completed within a vehicle start duration; or the vehicle start duration being expired and the transmission of the downloaded software for update in the background being completed.

The method may further comprise canceling, by the management controller, the software update of the performance controller based on: the transmission of the downloaded software for update in the background being incomplete; and a vehicle start duration being expired.

The method may further comprise canceling, by the management controller, the software update of the performance controller based on at least one of: an absence of a separate start-off request in a state where a maximum start duration of a power controller elapses; a start-off signal according to manipulation of a start button being received; a manipulation of a brake pedal being detected; a gear shift being detected; a remote start control command being received from a user terminal; or an activation of a burglar alarm.

The method may further comprise identifying, by the management controller, a vehicle state based on: a setting of the server; and the transmission of the downloaded software for update in the background being completed.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
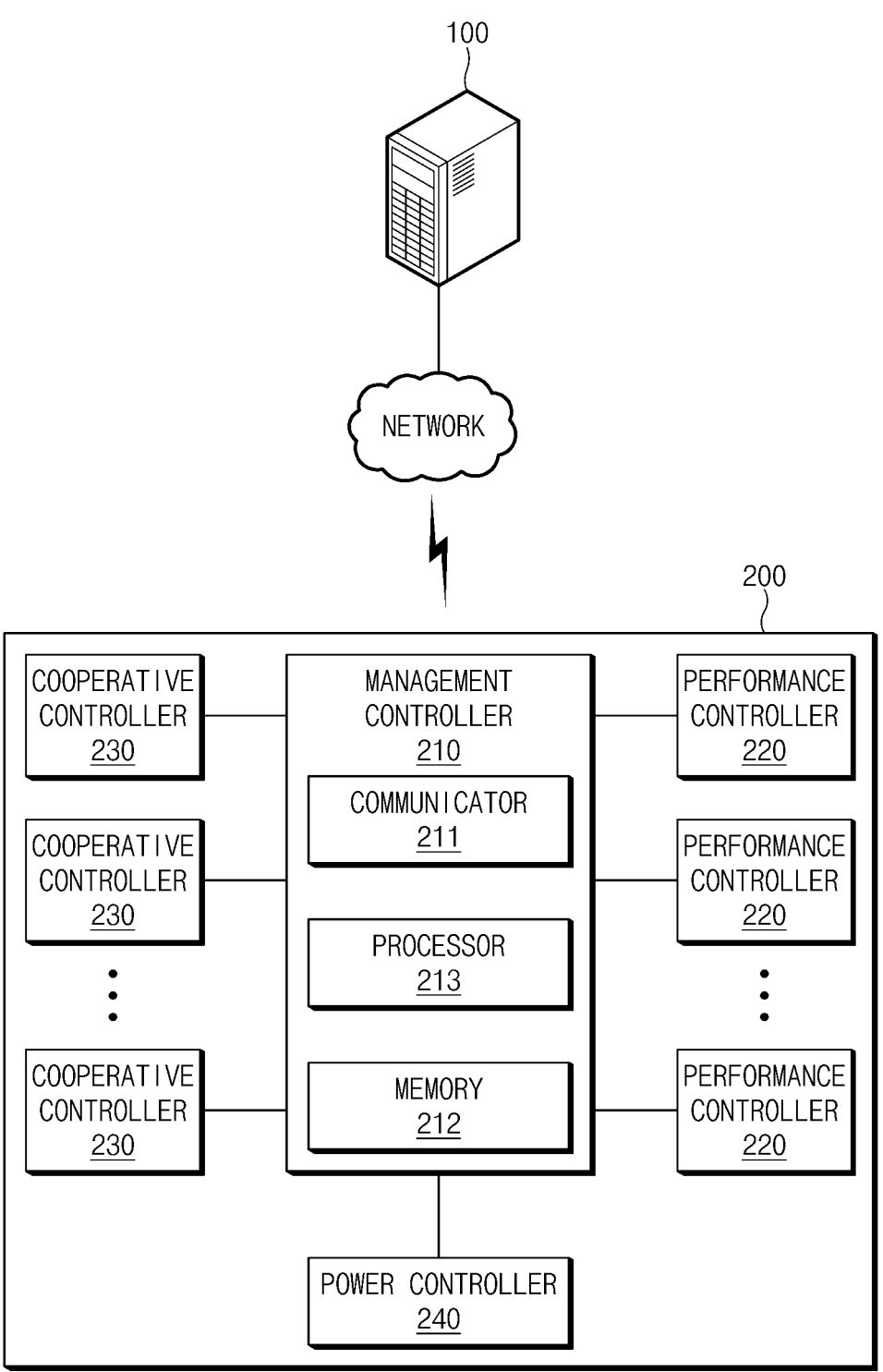
FIG. 1 is a block diagram illustrating a configuration of a vehicular software update system.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a vehicular software update system.

The vehicular software update system may remotely control a vehicle to start using a connected car system (CCS) service between a server 100 and the vehicle to identify a vehicle state and may perform an over-the-air (OTA) software update of the vehicle even in a state where a user alights from the vehicle and leaves the vehicle. The CCS service may be defined as a service capable of identifying and manipulating a function in the vehicle from outside the vehicle using a modem in the vehicle and a communication network.

The vehicular software update system may provide a remote software update for updating software installed in the vehicle using the CCS service and an OTA technology. Referring to FIG. 1, the vehicular software update system may include the server 100 and a remote update control device 200

The server 100 may store and manage software in the form of a database for each vehicle type and/or each electronic control device (ECU). The server 100 may register new version software provided from a vehicle manufacturer as latest version software. The server 100 may transmit version information of newly registered software to the remote update control device 200 of the vehicle. The server 100 may transmit the latest version software depending on the request of the remote update control device 200.

The server 100 may receive versions of pieces of respective controller software (e.g., pieces of software installed in the vehicle) and vehicle information (e.g., a vehicle type, an area, a vehicle identification number (VIN), and/or the like), which are transmitted from the remote update control device 200. The server 100 may identify the current version (e.g., an up-to-date version) for each software, which may be received from the remote update control device 200, and may specify a target version for each software based on the identified current version. The server 100 may instruct the remote update control device 200 to download a software package for updating software to the target version.

The server 100 may transmit a control command to perform a remote software update to the remote update control device 200 of the vehicle using the CCS service. The control command may be transmitted to the remote update control device 200 in the form of a text message. The control command may include a request to perform a remote software update, vehicle start on or off, a determination condition, a target version, and/or the like. The server 100 may receive and control the result of performing the control command and a vehicle state, which may be transmitted from the remote update control device 200.

The remote update control device 200 may include a management controller 210, at least one performance controller 220, at least one cooperative controller 230, and a power controller 240, which may be connected through an in-vehicle network (IVN). The IVN may be implemented as a controller area network (CAN), a media oriented systems transport (MOST) network, a local interconnect network (LIN), an Ethernet, an X-by-Wire (Flexray), and/or the like.

The management controller 210 may be a controller which manages software version information for each performance controller 220 and manage an OTA update when a software update is available or required. The management controller 210 may download a software package for updating at least one target software from the server 100. The management controller 210 may transmit software (e.g., latest version software) for update, which may be included in the downloaded software package, to the corresponding performance controller 220 (e.g., to perform reprogramming).

The performance controller 220 may be a remote software update target, which may be an ECU which may be installed in the vehicle to perform a predetermined function (e.g., a driver assistance function, an obstacle detection function, and/or the like). Although not illustrated in the drawing, the performance controller 220 may include a processor, a memory, a communication circuit, and the like.

The performance controller 220 may receive and store software for update, which may be transmitted from the management controller 210, in the memory. The performance controller 220 may perform reprogramming using software for update to update software installed in the performance controller 220 (e.g., control logic previously stored in the memory).

The cooperative controller 230 may receive a vehicle start control request for a remote software update from the management controller 210. The cooperative controller 230 may control the vehicle to start depending on the received vehicle start control request. The cooperative controller 230 may transmit a signal indicating a vehicle state for a software update. The cooperative controller 230 may be a start controller and/or the power controller 240.

The power controller 240 may control the vehicle power supply depending to the request of the management controller 210. For example, the power controller 240 may turn on or off the vehicle power supply based on the vehicle state.

Although not illustrated in the drawing, like the performance controller 220, each of the cooperative controller 230 and the power controller 240 may include a processor, a memory, a communication circuit, and the like.

Hereinafter, the configuration of the management controller 210 included in the remote update control device 200 will be described.

The management controller 210 may include a communicator 211, a memory 212, and a processor 213.

The communicator 211 may support wireless communication (or OTA communication) between the server 100 and the management controller 210. The communicator 211 may include a communication circuit which performs wireless communication such as vehicle to infrastructure (V2I) communication, wireless local area network (WLAN) (Wi-Fi), wireless broadband (Wibro), long term evolution (LTE), international mobile telecommunication (IMT)-2020, Bluetooth, near field communication (NFC), or the like.

The communicator 211 may receive the control command transmitted from the server 100 through the CCS service. The communicator 211 may transmit the result of performing the control command to the server 100, for example, under an instruction of the processor 213.

The communicator 211 may download a software package for update (e.g., a latest version software package from the server 100) under an instruction of the processor 213. The communicator 211 may transmit software version information of each of the controllers 210 to 240 in the vehicle, vehicle information, an update result, and/or the like to the server 100. The communicator 211 may receive an update command transmitted from the server 100.

The memory 212 may store the software package for update, which may be received through the communicator 211. The memory 212 may store wireless communication control logic, update management logic, and update execution logic, which may be executed by the processor 213.

The memory 212 may be a non-transitory storage medium which stores instructions executed by the processor 213. The memory 212 may include at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), an embedded multimedia card (eMMC) or a universal flash storage (UFS).

The processor 213 may be electrically connected with the communicator 211 and the memory 212. The processor 213 may control the overall operation of the management controller 210. The processor 213 may include at least one of processing devices such as an application specific integrated circuit (ASIC), a digital signal processor (DSP), programmable logic devices (PLD), field programmable gate arrays (FPGAs), a central processing unit (CPU), microcontrollers, or processor microprocessors.

The processor 213 may receive the request for the remote software update, which is transmitted from the server 100 through the communicator 211. The server 100 may transmit the request for the remote software update in the form of a text message using the CCS service.

If the request for the remote software update is received, the processor 213 may identify a vehicle state, for example, a vehicle power state (or vehicle power) and whether OTA proceeds by means of the cooperative controller 230 and the power controller 240. The processor 213 may determine whether the identified vehicle state meets a remote update initiation condition. The processor 213 may determine whether to start a remote software update depending on whether the vehicle state meets the remote update initiation condition. The remote update initiation condition may be defined as the case where the vehicle state meets both of a vehicle power condition and an OTA condition disclosed in Table 1 below. Herein, the remote update initiation condition may refer to a minimum condition for starting the remote software update.

TABLE 1

| Classification | Condition | Description |
| --- | --- | --- |
| Vehicle power | IGN-OFF | The vehicle is turned off and is powered off. |
| | IGN3-OFF | The electric vehicle is not charging or replenished. |
| OTA | No progress (IDLE state) | It is able to start a new update from the beginning. |

As an example, when the vehicle is powered off and is turned off and when there is no software update which is in progress through OTA, the processor 213 may determine to initiate a remote update. As another example, in a situation where the high voltage battery of the electric vehicle is charged or in a replenishment situation where the low voltage battery is charged using the high voltage battery and when there is no software update which is in progress through OTA, the processor 213 may determine to initiate a remote update.

As another example, if a software update is previously in progress through OTA, the processor 213 may decline a request to start a remote software update from the server 100. The processor 213 may transmit a decline response to the request of the server 100 through the communicator 211.

After determining whether to start the remote software update, the processor 213 may request the power controller 240 to control the vehicle to start (e.g., be turned on or off). If it is determined to start the remote software update, the processor 213 may request the power controller 240 to turn on the vehicle. If the vehicle start request of the management controller 210 is received, the power controller 240 may control the vehicle to start (or remotely start) under the determination condition of Table 2 below. The determination condition of Table 2 below may refer to a condition for remote start control.

TABLE 2

| Classification | Condition | Description |
| --- | --- | --- |
| Vehicle power | IGN-OFF | The vehicle is turned off and is powered off. |
| Gear | P stage | Identify the P stage of the gear to prevent the vehicle from rolling |
| OTA start prohibition request | No request | There is no start prohibition request because OTA is not operating or fails (it is able to normally proceed with power and start control). |
| Burglar alarm | No generation of burglar alarm | Vehicle critical mode, it is difficult to proceed with a secure update when the burglar alarm occurs) |

As an example, in a state where the vehicle is powered off and turned off, if the gear is in the parking (P) stage, there is no OTA start prohibition request, and a burglar alarm does not occur, the power controller 240 may turn on the vehicle. As another example, the power controller 240 may turn off the vehicle, for example, if the vehicle is powered on and/or is turned on, the gear is not in the P stage (e.g., when the gear is in the D stage), there is a start prohibition request because OTA is operating or fails, the burglar alarm occurs, or in at least one of combinations thereof.

The power controller 240 may transmit the result of performing the vehicle start control (or remote start control)

request of the management controller 210 to the management controller 210. For example, the power controller 240 may control the vehicle to start depending on the vehicle start control request and may transmit a response indicating vehicle start on or vehicle start off according to it to the management controller 210. The case where the power controller 240 controls the vehicle to start is described as an example. However, the cooperative controller 230 may control the vehicle to start under an instruction of the management controller 210.

If the vehicle is turned on, the processor 213 may communicate with the server 100 depending on an OTA software update procedure to download software for update. The processor 213 may transmit the downloaded software for update to the performance controller 220 in the background. The power controller 240 may maintain a start state based on a vehicle start duration included in the control command transmitted from the server 100 and the update progress state.

The processor 213 may perform a remote software update and may turn off the vehicle if at least one of conditions of Table 3 below is met.

TABLE 3

| Classification | Condition | Description |
| --- | --- | --- |
| Normal end | Completion of transmission in background | When transmission in the background is completed |
| | Expiration of start duration and completion of transmission in background | When the vehicle start duration set by the server expires and transmission in the background is completed |
| Abnormal end | Expiration of start duration and no completion of transmission in background | When the vehicle start duration set by the server expires and transmission in the background is not completed |
| | Timeout | When the maximum start duration (e.g., 50 minutes) of the power controller elapses, but there is no separate start-off request |
| | Press the start button | When the start button is pressed in a start state to turn off the vehicle (when it is determined as an update interruption behavior) |
| | Brake input | When manipulating the brake pedal and intervening in an update |
| | Gear shift | When shifting the gear from the P stage to another gear stage and intervening in an update |
| | Press remote start button of remote controller | When inputting a start behavior of the user having a higher priority than a remote software update |
| | Generation of burglar alarm | Vehicle critical mode |

If the transmission of the software for update in the background is completed or if the vehicle start duration set by the server 100 expires and the transmission of the software for update in the background is completed, the processor 213 may request the power controller 240 to turn off the vehicle and may determine current start off as "normal end". Meanwhile, if the vehicle start duration set by the server 100 expires and the transmission of the software for update in the background is not completed, if there is no separate start-off request in a state where the maximum start duration of the power controller 240 elapses, if the start-off signal according to the manipulation of the start button is received, if the manipulation of the brake pedal is detected, if the gear shift is detected, if a remote start control command is received from a user terminal (e.g., a remote controller, a smartphone, or the like), if the burglar alarm occurs, or in at least one of combinations thereof, the processor 213 may request the power controller 240 to turn off the vehicle and may determine current start off as "abnormal end". If the start-off signal according to the manipulation of the start button in the vehicle is received, the power controller 240 may determine to turn off the vehicle. The power controller 240 may transmit a signal indicating start-off to the processor 213.

If the starting of the vehicle is normally ended, the processor 213 may proceed with a software update depending on the software update procedure. At this time, the processor 213 may identify a vehicle state and may proceed with a software update based on the vehicle state. If the starting of the vehicle is abnormally ended, the processor 213 may cancel and initialize an OTA software update.

If an update preparation is completed and the vehicle is turned off, the processor 213 may execute a software update on the performance controller 220. At this time, the processor 213 may identify a vehicle state before a software update depending on a vehicle state identification condition of Table 4 below to minimize user intervention for an update and respond to a floating vehicle state depending on a situation. The vehicle state identification condition may be configurable, may be set in the server 100, and may be delivered to the vehicle through the CCS service.

TABLE 4

| Vehicle state identification condition | Description |
| --- | --- |
| Omit user approval | It is able to proceed with an update even without receiving a separate approval input to execute the update although the driver does not visit the vehicle. |
| Ignore low voltage battery state | It is able to omit individual state identification and proceed with an update to execute an update |
| Ignore high voltage battery state | irrespective of a vehicle state. |
| Ignore gear value state | open-storage area update (execute reprogramming before customer delivery), an error situation of the controller which transmits the corresponding signal, or the like |
| Ignore vehicle speed state | |
| Ignore lamp ON/OFF state | |
| Ignore hood open/close state | |
| Ignore EPB engagement state | |
| Ignore state of performance controller | |

The processor 213 may transmit the result of performing the software update to the server 100. For example, if the software update of the performance controller 220 is completed, the processor 213 may transmit the result of performing the update, such as "update completion" or "update success", to the server 100 through the communicator 211. If the software update of the performance controller 220 is stopped, the processor 213 may transmit "update failure" as the result of performing the update to the server 100.

Figure 2:
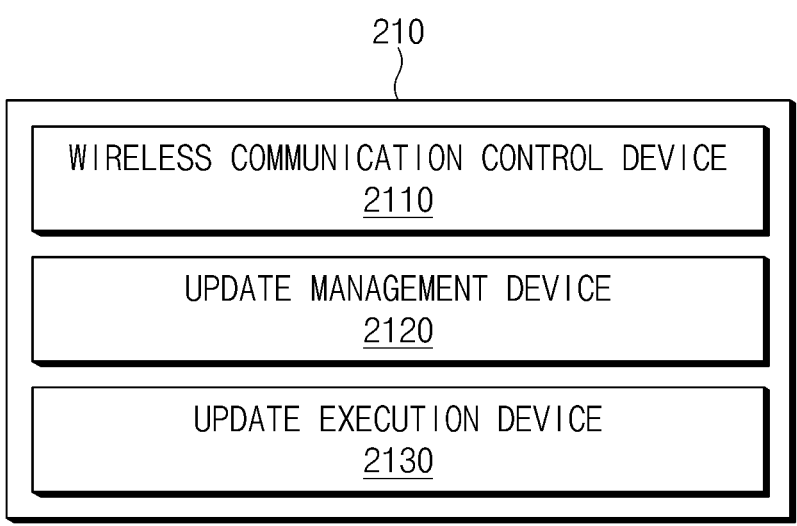
FIG. 2 illustrates a functional block diagram of a management controller.

FIG. 2 illustrates a functional block diagram of a management controller.

A management controller 210 may use a remote software update service provided through a CCS service. The management controller 210 may include a wireless communication control device 2110, an update management device 2120, and an update execution device 2130.

The wireless communication control device 2110 may transmit and receive data (or information) using a communicator 211 of FIG. 1. The wireless communication control device 2110 may transmit pieces of version information, update results, and the like of pieces of software installed in the vehicle. For example, the wireless communication control device 2110 may transmit pieces of software version information, update results, and the like of controllers (e.g., a performance controller 220 or the like of FIG. 1) in the vehicle. The wireless communication control device 2110 may transmit vehicle state information to a server 100 of FIG. 1.

The wireless communication control device 2110 may receive a remote software update command transmitted from the server 100 through the communicator 211. The remote software update command may be a command for the server 100 to request a management controller 210 of FIG. 1 to perform a remote software update using a CCS service.

The wireless communication control device 2110 may download a software package for updating pieces of software of controllers in the vehicle from the server 100. The wireless communication control device 2110 may transmit the result of performing the remote software update to the server 100.

The update management device 2120 may identify a vehicle state or may control the vehicle to start, through communication with a cooperative controller 230 and a power controller 240 of FIG. 1. The update management device 2120 may manage (e.g., take charge of) an OTA software update of the vehicle and may request the wireless communication control device 2110 to perform wireless communication between the server 100 and the management controller 210.

The update execution device 2130 may transmit latest version software (or software for update) to the performance controller 220 under a command (or an instruction) of the update management device 2120. The performance controller 220 may update software previously installed in the performance controller 220 using the latest version software. The performance controller 220 may perform reprogramming using the software for update. The update execution device 2130 may transmit the result of performing the software update of the performance controller 220 to the update management device 2120.

Figure 3:
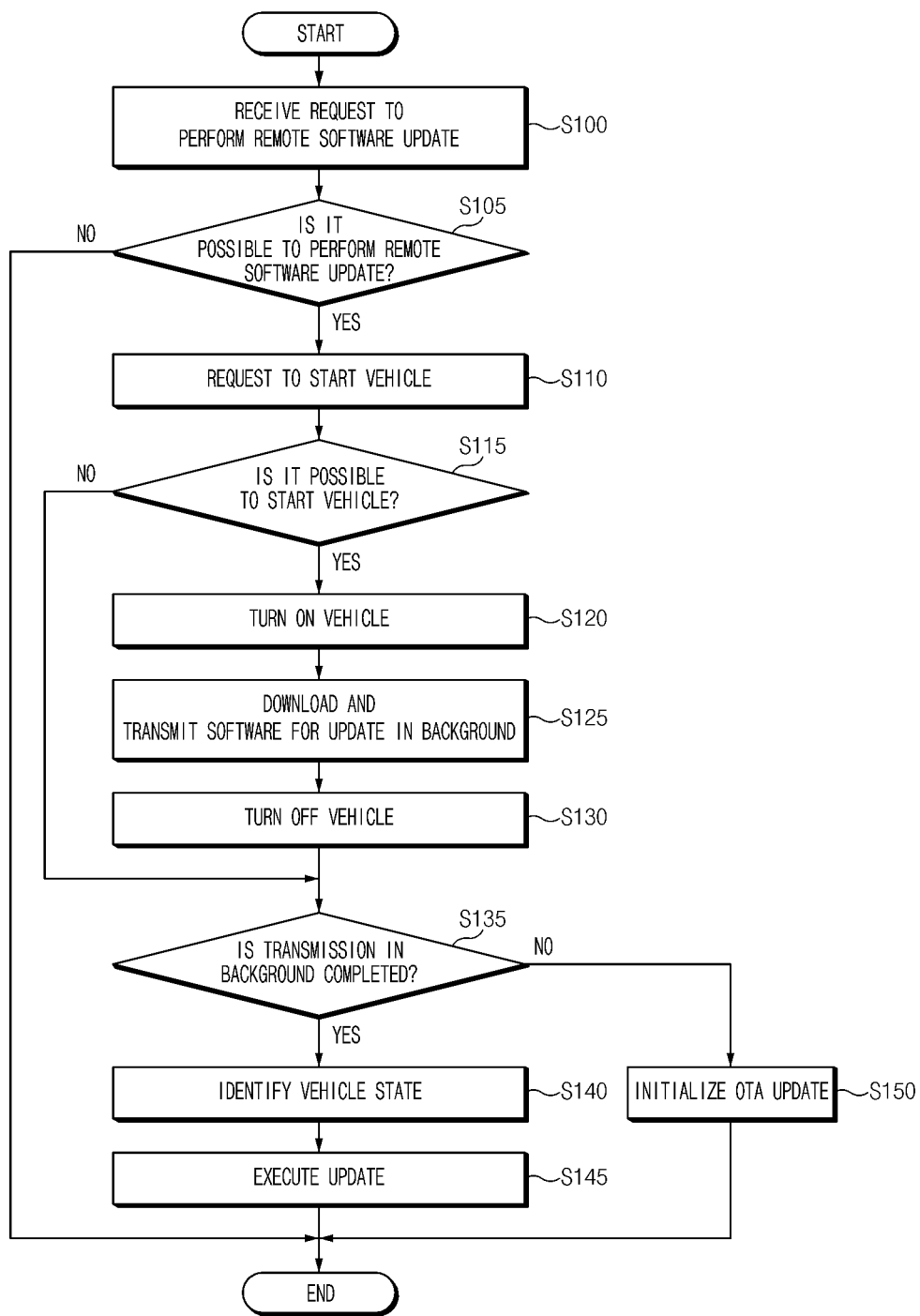
FIG. 3 is a flowchart illustrating a vehicular software update method.

FIG. 3 is a flowchart illustrating a vehicular software update method.

In S100, a device (e.g., a management controller 210 of FIG. 1) may receive a request to perform a remote software update (e.g., from a server 100 of FIG. 1 through a CCS service). The server 100 may transmit a control command to request to perform a remote software update provided in the CCS service to the management controller 210 of the vehicle. The control command may include a vehicle start control command, determination condition(s), and the like and may be transmitted in the form of a text message.

If the request to perform the remote software update is received from the server 100, in S105, the management controller 210 may determine whether it is possible to perform the remote software update. As an example, when the vehicle is turned off and is powered off and when there is no software update which is in progress through OTA, the management controller 210 may determine that it is possible for the vehicle to perform the remote software update. As another example, when the high voltage battery of the vehicle (e.g., an electric vehicle) is not charging or when the low voltage battery is not charging using the high voltage battery and when there is no software update which is in progress through OTA, the management controller 210 may determine that it is possible for the vehicle to perform the remote software update. As another example, when the vehicle is turned on and/or is powered on, when the high voltage battery of the vehicle is charging, when the low voltage battery is charging using the high voltage battery of the vehicle, or when a software update is in progress through OTA, the management controller 210 may determine that it is not available for the vehicle to update the remote software update.

If it is determined that it is possible for the vehicle to perform the remote software update, in S110, the management controller 210 may request a power controller 240 of the vehicle to start the vehicle. The management controller 210 may request the power controller 240 to turn on the vehicle.

In S115, the management controller 210 may determine whether it is possible to start the vehicle (e.g., by using the power controller 240). The power controller 240 may determine whether it is possible to start the vehicle based on a remote start control condition (e.g., the remote start control condition of Table 2 above). In a state where the vehicle is powered off or turned off, when the gear is in the P-stage, when there is no OTA start prohibition request, and when the burglar alarm does not occur, the power controller 240 may determine that it is possible to start the vehicle. When the vehicle is powered on or turned on, when the gear is not in the P-stage, when there is an OTA start prohibition request because OTA is operating or fails, or when the burglar alarm occurs, the power controller 240 may determine that it is not available to start the vehicle. The power controller 240 may transmit the result of determining whether it is possible to start the vehicle to the management controller 210.

If it is determined that it is possible to start the vehicle, in S120, the management controller 210 may turn on the vehicle. For example, the management controller 210 may turn on an ignition switch to start the engine (e.g., by using the power controller 240).

In S125, the management controller 210 may download software for update depending on an OTA software update scenario and may transmit the downloaded software for update to a target controller in the vehicle in the background. The management controller 210 may download latest version software from the server 100. The management controller 210 may transmit the downloaded latest version software to a target controller (e.g., a performance controller 220 of FIG. 1) matched with the downloaded latest version software among controllers in the vehicle.

In S130, the management controller 210 may turn off the vehicle. The power controller 240 may maintain a start state based on a vehicle start duration included in the control command transmitted from the server 100 and the update progress state. The management controller 210 may perform a remote software update and may turn off the vehicle (e.g., when at least one of conditions of Table 3 above is met). As an example, when the transmission of the latest version software in the background is completed within the vehicle start duration or when the vehicle start duration expires and the transmission of the latest version software in the background is completed, the management controller 210 may request the power controller 240 to turn off the vehicle. As another example, when the transmission of the software for update in the background is not completed in a state where the vehicle start duration expires, when there is no separate start-off request in a state where a maximum start duration of the power controller 240 elapses, when a start-off signal according to the manipulation of the start button is received, when the manipulation of the brake pedal is detected, when the gear shift is detected, when the remote start control command is received from a user terminal (e.g., a remote controller, a smartphone, or the like), or when the burglar alarm occurs, the management controller 210 may request the power controller 240 to turn off the vehicle. The power controller 240 may turn off the vehicle depending on the request of the management controller 210 and may transmit a signal indicating that the vehicle is turned off to the management controller 210.

When the vehicle is turned off, in S135, the management controller 210 may determine whether the transmission of the software for update in the background is completed.

If the transmission in the background is completed, in S140, the management controller 210 may identify a vehicle state depending to settings of the server 100. The management controller 210 may identify a vehicle state depending on a predetermined vehicle state identification condition of Table 4 above.

After identifying the vehicle state, in S145, the management controller 210 may execute a software update of the target controller. If a preparation for a software update is completed and the vehicle is turned off, the management controller 210 may instruct the performance controller 220 to perform a software update. The performance controller 220 may perform reprogramming using the software for update under the command of the management controller 210 to update previous version software to latest version software. The management controller 210 may transmit the result of performing the software update of the performance controller 220 to the server 100. The management controller 210 may transmit a software update progress state of the performance controller 220 to the server 100.

If the transmission of the software for update in the background is not completed in S135, in S150, the management controller 210 may initialize and end the OTA update.

The case where the vehicle state is identified before executing the software update is described in the above-described example. However, the process of identifying the vehicle state in S140 may be omitted. For example, if the transmission of the software for update in the background is completed in S135, the management controller 210 may proceed with a software update of the performance controller 220 using the software for update, which is transmitted in the background.

According to an aspect of the present disclosure, a vehicular software update system may include a management controller installed in a vehicle and a server that performs a remote software update in cooperation with the management controller. The management controller may control the vehicle to start in response to receiving a request for the remote software update from the server, may download software for update from the server after controlling the vehicle to start, may transmit the downloaded software for update to a performance controller in the background, may determine whether the transmission of the software for update in the background is completed based on that the vehicle is turned off, and may perform a software update of the performance controller using the software for update based on that the transmission of the software for update in the background is completed.

The server may transmit a control command for the remote software update to the management controller using a connected car system (CCS) service. The control command may include the request for the remote software update.

The management controller may determine whether to initiate the remote software update based on a vehicle power state and whether a software update proceeds through over the air (OTA) based on that the request for the remote software update is received.

The management controller may determine whether it is possible to start the vehicle by a power controller and may transmit a request to turn on the vehicle to the power controller based on determining that it is possible to start the vehicle. The power controller may determine whether it is possible to start the vehicle based on at least one of a vehicle power state, a gear state, whether there is an OTA start prohibition request, whether a burglar alarm occurs, or a combination thereof and may turn on the vehicle based on the request to turns on the vehicle.

The power controller may maintain a start state of the vehicle based on a vehicle start duration which are included in a control command transmitted from the server and an update progress state.

The management controller may determine whether the transmission of the software for update in the background is completed within the vehicle start duration based on that the vehicle is turned off.

The management controller may proceed with the software update of the performance controller based on that the transmission of the software for update in the background is completed within the vehicle start duration or that the vehicle start duration expires, and the transmission of the software for update in the background is completed.

The management controller may cancel the software update of the performance controller based on that the transmission of the software for update in the background is not completed in a state where the vehicle start duration expires.

The management controller may cancel the software update of the performance controller based on at least one of that there is no separate start-off request in a state where a maximum start duration of the power controller elapses, that a start-off signal according to manipulation of a start button is received, that manipulation of a brake pedal is detected, that a gear shift is detected, that a remote start control command is received from a user terminal, that a burglar alarm occurs, or a combination thereof.

The management controller may identify a vehicle state based on a setting of the server based on that the transmission of the software for update in the background is completed.

According to another aspect of the present disclosure, a vehicular software update method may include receiving by a management controller of a vehicle, a request for a remote software update from a server, controlling, by the management controller, the vehicle to start based on that the request for the remote software update is received, downloading, by the management controller, software for update from the server after controlling the vehicle to start, transmitting, by the management controller, the downloaded software for update to a performance controller in the background, determining, by the management controller, whether the transmission of the software for update in the background is completed based on that the vehicle is turned off, and performing, by the management controller, a software update of the performance controller using the software for update based on that the transmission of the software for update in the background is completed.

The receiving of the request for the remote software update may include transmitting, by the server, the request for the remote software update to the management controller using a connected car system and determining, by the management controller, whether to initiate the remote software update based on a vehicle power state and whether a software update proceeds through over the air (OTA) based on that the request for the remote software update is received.

The controlling of the vehicle to start may include determining, by a power controller of the vehicle, whether it is possible to start the vehicle based on at least one of a vehicle power state, a gear state, whether there is an OTA start prohibition request, whether a burglar alarm occurs, or a combination thereof, transmitting, by the management controller, a request to turn on the vehicle to the power controller based on determining by the power controller that it is possible to start the vehicle, and turning on, by the power controller, the vehicle based on the request to turns on the vehicle.

The determining of whether the transmission of the software for update in the background is completed may include maintaining, by the power controller, a start state of the vehicle based on a vehicle start duration which are included in a control command transmitted from the server and an update progress state.

The determining of whether the transmission of the software for update in the background is completed may include determining, by the management controller, whether the transmission of the software for update in the background is completed within the vehicle start duration based on that the vehicle is turned off.

The performing of the software update of the performance controller may include proceeding, by the management controller, with the software update of the performance controller based on that the transmission of the software for update in the background is completed within the vehicle start duration or that the vehicle start duration expires, and the transmission of the software for update in the background is completed.

The performing of the software update of the performance controller may further include canceling, by the management controller, the software update of the performance controller based on that the transmission of the software for update in the background is not completed in a state where the vehicle start duration expires.

The canceling of the software update of the performance controller may further include canceling, by the management controller, the software update of the performance controller based on at least one of that there is no separate start-off request in a state where a maximum start duration of the power controller elapses, that a start-off signal according to manipulation of a start button is received, that manipulation of a brake pedal is detected, that a gear shift is detected, that a remote start control command is received from a user terminal, that a burglar alarm occurs, or a combination thereof.

The vehicular software update method may further include identifying, by the management controller, a vehicle state based on a setting of the server based on that the transmission of the software for update in the background is completed.

According to various features of the present disclosure, a device may remotely control a vehicle state using a connected car system (CCS) service, thus making the vehicle available for a software update although the user does not drive the vehicle.

According to various features of the present disclosure, a device may conditionally process vehicle state identification including user approval, thus automatically performing a software update of the vehicle without the user approval.

According to various features of the present disclosure, a device may perform a software update although the user does not visit and manipulate the vehicle to collectively perform a software update of each of the vehicles in an open-storage area before being released to customers, thus reducing technician labor and updating vehicle software.

According to various features of the present disclosure, a reservation update may be performed in a specific time after the user turns off the vehicle and alights from the vehicle.

Hereinabove, although the present disclosure has been described with reference to various examples and the accompanying drawings, the present disclosure is not limited thereto, but may be variously modified and altered by those skilled in the art to which the present disclosure pertains without departing from the spirit and scope of the present disclosure claimed in the following claims. Therefore, embodiment(s) of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicular software update system comprising:
a management controller installed in a vehicle,
wherein the management controller is configured to:
control the vehicle to start in response to receiving a request for a remote software update from a server;
download software for update from the server after controlling the vehicle to start;
transmit the downloaded software for update to a performance controller in a background;
determine, based on the vehicle being turned off, whether the transmission of the downloaded software for update in the background is completed; and
perform, based on the transmission of the downloaded software for update in the background being completed, a software update of the performance controller using the downloaded software for update.

2. The vehicular software update system of claim 1, wherein the management controller is configured to receive a control command for the remote software update using a connected car system, and
wherein the control command comprises the request for the remote software update.

3. The vehicular software update system of claim 1, wherein the management controller is configured to:
determine, based on a vehicle power state, whether to initiate the remote software update; and
determine, based on the request for the remote software update being received, whether a software update proceeds through over the air (OTA).

4. The vehicular software update system of claim 1, wherein the management controller is configured to:
determine whether it is possible to start the vehicle by a power controller; and
transmit, based on determining that it is possible to start the vehicle, a request to turn on the vehicle to the power controller, and
wherein the power controller is configured to:
determine whether it is possible to start the vehicle based on at least one of:

a vehicle power state, a gear state, an absence of an OTA start prohibition request, or an absence of a burglar alarm; and
turn on the vehicle based on the request to turn on the vehicle.

5. The vehicular software update system of claim 4, wherein the power controller is configured to maintain a start state of the vehicle based on:
a vehicle start duration included in a control command transmitted from the server; and
an update progress state.

6. The vehicular software update system of claim 1, wherein the management controller is configured to determine, based on the vehicle being turned off, whether the transmission of the downloaded software for update in the background is completed within a vehicle start duration.

7. The vehicular software update system of claim 1, wherein the management controller is configured to start the software update of the performance controller based on:
the transmission of the downloaded software for update in the background being completed within a vehicle start duration; or
the vehicle start duration being expired and the transmission of the downloaded software for update in the background being completed.

8. The vehicular software update system of claim 1, wherein the management controller is configured to cancel the software update of the performance controller based on:
the transmission of the downloaded software for update in the background being incomplete; and
a vehicle start duration being expired.

9. The vehicular software update system of claim 1, wherein the management controller is configured to cancel the software update of the performance controller based on at least one of:
an absence of a separate start-off request in a state where a maximum start duration of a power controller elapses;
a start-off signal according to manipulation of a start button being received;
a manipulation of a brake pedal being detected;
a gear shift being detected;
a remote start control command being received from a user terminal; or
an activation of a burglar alarm.

10. The vehicular software update system of claim 1, wherein the management controller is configured to identify a vehicle state based on:
a setting of the server; and
the transmission of the downloaded software for update in the background being completed.

11. A vehicular software update method comprising:
receiving, by a management controller of a vehicle, a request for a remote software update from a server;
controlling, by the management controller and based on the request for the remote software update, the vehicle to start;
downloading, by the management controller, software for update from the server after controlling the vehicle to start;
transmitting, by the management controller, the downloaded software for update to a performance controller in a background;
determining, by the management controller and based on the vehicle being turned off, whether the transmission of the downloaded software for update in the background is completed; and performing, by the management controller and based on the transmission of the downloaded software for update in the background being completed, a software update of the performance controller using the downloaded software for update.

12. The vehicular software update method of claim 11, further comprising:

determining, by the management controller and based on a vehicle power state, whether to initiate the remote software update; and determining, by the management controller and based on the request for the remote software update being received, whether a software update proceeds through over the air (OTA), wherein the receiving of the request for the remote software update comprises receiving the request for the remote software update using a connected car system.

13. The vehicular software update method of claim 11, wherein the controlling of the vehicle to start comprises:

determining, by a power controller of the vehicle, whether it is possible to start the vehicle based on at least one of:

a vehicle power state, a gear state, an absence of an OTA start prohibition request, or an absence of a burglar alarm;

transmitting, by the management controller and based on determining that it is possible to start the vehicle, a request to turn on the vehicle to the power controller; and turning on, by the power controller and based on the request to turn on the vehicle, the vehicle.

14. The vehicular software update method of claim 13, wherein the determining of whether the transmission of the downloaded software for update in the background is completed comprises:

maintaining, by the power controller, a start state of the vehicle based on:

a vehicle start duration included in a control command transmitted from the server; and an update progress state.

15. The vehicular software update method of claim 11, wherein the determining of whether the transmission of the downloaded software for update in the background is completed comprises:

determining, by the management controller and based on the vehicle being turned off, whether the transmission of the downloaded software for update in the background is completed within a vehicle start duration.

16. The vehicular software update method of claim 11, wherein the performing of the software update of the performance controller comprises:

starting, by the management controller, the software update of the performance controller based on:

the transmission of the downloaded software for update in the background being completed within a vehicle start duration; or the vehicle start duration being expired and the transmission of the downloaded software for update in the background being completed.

17. The vehicular software update method of claim 11, further comprising:

canceling, by the management controller, the software update of the performance controller based on:

the transmission of the downloaded software for update in the background being incomplete; and a vehicle start duration being expired.

18. The vehicular software update method of claim 11, further comprising:

canceling, by the management controller, the software update of the performance controller based on at least one of:

an absence of a separate start-off request in a state where a maximum start duration of a power controller elapses;

a start-off signal according to manipulation of a start button being received;

a manipulation of a brake pedal being detected;

a gear shift being detected;

a remote start control command being received from a user terminal; or an activation of a burglar alarm.

19. The vehicular software update method of claim 11, further comprising:

identifying, by the management controller, a vehicle state based on:

a setting of the server; and the transmission of the downloaded software for update in the background being completed.

* * * * *